US012094399B2

(12) United States Patent
Ma

(10) Patent No.: US 12,094,399 B2
(45) Date of Patent: Sep. 17, 2024

(54) POWER SUPPLY CIRCUIT, DRIVING CHIP AND DISPLAY APPARATUS

(71) Applicant: CHIPONE TECHNOLOGY (BEIJING) CO., LTD., Beijing (CN)

(72) Inventor: Yingjie Ma, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/255,381

(22) PCT Filed: Nov. 15, 2021

(86) PCT No.: PCT/CN2021/130736
§ 371 (c)(1),
(2) Date: Jun. 1, 2023

(87) PCT Pub. No.: WO2022/127468
PCT Pub. Date: Jun. 23, 2022

(65) Prior Publication Data

US 2023/0402000 A1 Dec. 14, 2023

(30) Foreign Application Priority Data

Dec. 17, 2020 (CN) ......................... 202011499656.4

(51) Int. Cl.
*G09G 3/32* (2016.01)

(52) U.S. Cl.
CPC ......... *G09G 3/32* (2013.01); *G09G 2330/021* (2013.01)

(58) Field of Classification Search
CPC ............... G09G 3/32; G09G 2330/028; G09G 2330/021; G09G 2330/02; G05F 1/561; H05B 45/345
See application file for complete search history.

(56) References Cited

U.S. PATENT DOCUMENTS 5,612,614 A 3/1997 Barrett et al.
5,867,067 A 2/1999 Moriarty, Jr.
(Continued)

FOREIGN PATENT DOCUMENTS

CN 103632635 A 3/2014
CN 104965560 * 10/2015
(Continued)

OTHER PUBLICATIONS

PCT/CN2021/130736, International Search Report mailed Feb. 10, 2022.
(Continued)

*Primary Examiner* — Dennis P Joseph
(74) *Attorney, Agent, or Firm* — AlphaPatent Associates Ltd.; Daniel J. Swirsky

(57) ABSTRACT

A power supply circuit, a driving chip and a display apparatus. The power supply circuit comprises: a reference current generation circuit (101), which is configured to generate a reference current; a driving circuit (302), which is connected to the reference current generation circuit (101) and is configured to generate, according to the reference current, a mirror image current with an adjustable mirror image proportion, and output a bias voltage and a gate driving voltage; and a channel current output circuit (303), which is connected to the driving circuit (302) and is configured to receive the bias voltage and the gate driving voltage, and generate, according to the mirror image current, a channel current with an adjustable mirror image proportion. Since a mirror image proportion is adjustable, the current precision can be improved, and when a relatively large output current is required, a mirror image current can remain relatively small, thereby reducing power consumption.

14 Claims, 2 Drawing Sheets

(56) References Cited

U.S. PATENT DOCUMENTS

| | | | | | |
|---|---|---|---|---|---|
| 2021/0051781 | A1* | 2/2021 | Song | H05B 45/44 | |
| 2023/0276550 | A1* | 8/2023 | Chen | H05B 45/395 | 315/291 |

FOREIGN PATENT DOCUMENTS

| | | | |
|---|---|---|---|
| CN | 104965560 | A | 10/2015 |
| CN | 105261327 | A | 1/2016 |
| CN | 109859681 | A | 6/2019 |
| CN | 110096089 | A | 8/2019 |
| CN | 110234188 | A | 9/2019 |
| CN | 110767152 | * | 11/2019 |
| CN | 110767152 | A | 2/2020 |
| CN | 112423436 | A | 2/2021 |
| CN | 214481381 | U | 10/2021 |

OTHER PUBLICATIONS

EP21905397.2, EPO Examination Report, Apr. 17, 2024.
EP21905397.2, EPO Search Report, Apr. 5, 2024.
JP2023524873, JPO Examination Report, Apr. 8, 2024.

* cited by examiner

POWER SUPPLY CIRCUIT, DRIVING CHIP AND DISPLAY APPARATUS

CROSS-REFERENCE TO RELATED APPLICATION

The present disclosure claims priority to Chinese Patent Application No. 2020114996564 filed on Dec. 17, 2020 with the Chinese Patent Office, and entitled "Power Supply Circuit and Display Apparatus", the contents of which are incorporated herein by reference in entirety.

TECHNICAL FIELD

The present disclosure relates to the technical field of integrated circuits, in particular to a power supply circuit, a driving chip and a display apparatus.

BACKGROUND ART

Among LED (Light Emitting Diode) display driving chips, most of them use the structure shown in FIG. 1 as the constant-current-source generating circuit. The constant-current-source generating circuit is divided into three parts, wherein the first part is the reference-current generating circuit 101, the second part is the current mirror circuit 102, and the third part is the current output circuit 103. The specific working principle of the constant-current generating circuit is that: firstly, the reference-current generating circuit 101 generates the reference current $I_0$ by using the built-in reference voltage Vref and the external resistor Rext, and then the current $I_1$ is obtained by mirroring the current through the current mirror circuit 102 (the ratio of the number of MOS metal oxide semiconductor devices is M:N); finally, the output constant-current source Iout is generated and driven through the current output circuit 103 (the ratio of the number of MOS devices is J:K). Among them, the second and third parts are to adapt to the LED common anode structure and meet the requirement for capability of multi-channel driving.

In the case of requiring a large constant-current-source current Iout output, since the ratio of K:J is fixed, the current $I_1$ needs to be very large, thereby the power consumption of the chip increases.

SUMMARY

The embodiments of the present disclosure aim at providing a power supply circuit, a driving chip and a display apparatus.

The embodiment of the present disclosure provides a power supply circuit, including:

- a reference-current generating circuit, configured to generate a reference current;
- a driver circuit, connected to the reference-current generating circuit, and configured to generate a mirror current with adjustable mirror ratio according to the reference current, and output a bias voltage and a gate drive voltage; and
- a channel-current output circuit, connected to the driver circuit, and configured to receive the bias voltage and the gate drive voltage, and generate a channel current with adjustable mirror ratio according to the mirror current.

Optionally, the reference-current generating circuit includes

- a first amplifier, wherein the inverting input terminal is configured to input a reference voltage;
- a resistor, wherein the first terminal is grounded, and the second terminal is connected to the non-inverting input terminal of the first amplifier;
- multi-group first P-type field-effect transistors, wherein the sources are connected to the power supply, the gates are respectively connected to the output terminal of the first amplifier, the drains are connected to the second terminal of the resistor and output the reference current to the resistor; and
- a first switch, connected to the multi-group first P-type field-effect transistors, and configured to independently control whether the first P-type field-effect transistors of each group are turned on or not.

Optionally, the number of groups of the first P-type field-effect transistors is four.

Optionally, the driver circuit includes

- a second P-type field-effect transistor, wherein the source is connected to the power supply, the gate is connected to the gates of the multi-group first P-type field-effect transistors, and the drain is configured to output the mirror current;
- a second amplifier, wherein the inverting input terminal is configured to input reference voltage, and the output terminal is configured to provide the gate drive voltage; and
- a first N-type field-effect transistor, wherein the gate is connected to the output terminal of the second amplifier, the source is grounded, the drain is connected to the drain of the second P-type field-effect transistor and the non-inverting input terminal of the second amplifier, which is configured to provide the same bias voltage as the reference voltage.

Optionally, the channel-current output circuit includes

- a third amplifier, wherein the non-inverting input terminal is connected to the drain of the first N-type field-effect transistor;
- a third N-type field-effect transistor, wherein the gate is connected to the output terminal of the third amplifier; the source is connected to the inverting input terminal of the third amplifier, and the drain is configured to output the channel current;
- multi-group second N-type field-effect transistors, wherein the drains are respectively connected to the inverting input terminal of the third amplifier; the gates are respectively connected to the output terminal of the second amplifier; and the sources are grounded; and
- a second switch, connected to the multi-group second N-type field-effect transistors, and configured to independently control whether the second N-type field-effect transistors of each group are turned on or not.

Optionally, the number of groups of the second N-type field-effect transistors is four.

Optionally, the driver circuit also includes:

- a driver buffer, connected to the output terminal of the second amplifier and the gates of the multi-group second N-type field-effect transistors, and configured to increase the gate drive voltage.

Optionally, the driver buffer includes two inverters connected in series.

Optionally, the first switch includes a plurality of first sub-switches, with each independently controlling whether the multi-group first P-type field-effect transistors are turned on or not; and the second switch includes a plurality of second sub-switches, with each independently controlling whether the multi-group second N-type field-effect transistors are turned on or not.

Optionally, the plurality of first sub-switches are connected to the multi-group first P-type field-effect transistors in one-to-one correspondence; and the plurality of second sub-switches are connected to the multi-group second N-type field-effect transistors in one-to-one correspondence.

Optionally, the ratio of the number of multiple groups of the first P-type field-effect transistors is the same as the ratio of the number of multiple groups of the second N-type field-effect transistors.

Optionally, the adjustment ratio of the conducted number of the multi-group first P-type field-effect transistors is the same as the adjustment ratio of the conducted number of the multi-group second N-type field-effect transistors.

Optionally, the switch control signals for the first switch and the second switch are the same.

The embodiment of the present disclosure also provides a driving chip, including the above-mentioned power supply circuit.

The embodiment of the present disclosure also provides a display apparatus, including:

a LED display panel, wherein the LED display panel is a common cathode or common anode structure; and a driving chip, connected to the LED display panel, wherein the driving chip includes the above-mentioned power supply circuit, wherein there are multiple channel-current output circuits, wherein if the LED display panel is a common cathode structure, the multiple channel-current output circuits are respectively connected to the anodes of multiple light emitting diodes of the LED display panel; and if the LED display panel has a common anode structure, the multiple channel-current output circuits are respectively connected to the cathodes of the multiple light emitting diodes of the LED display panel.

BRIEF DESCRIPTION OF DRAWINGS

In order to illustrate the technical solutions of the embodiments of the present disclosure more clearly, the following drawings that are used in the embodiments of the present disclosure will be briefly introduced.

REFERENCE NUMERALS

101—reference-current generating circuit; 102—current mirror circuit; 103—current output circuit; 301—reference-current generating circuit; 302—driver circuit; 303—channel-current output circuit.

DETAILED DESCRIPTION OF EMBODIMENTS

The technical solutions in the embodiments of the present disclosure will be described below with reference to the drawings in the embodiments of the present disclosure.

Similar numbers and letters denote similar items in the following figures, so that once an item is defined in a figure, further definition and explanation in subsequent figures are not required. Meanwhile, in the description of the present disclosure, the terms "first", "second" and so on are only used to distinguish descriptions, and cannot be understood as indicating or implying relative importance.

Figure 1:
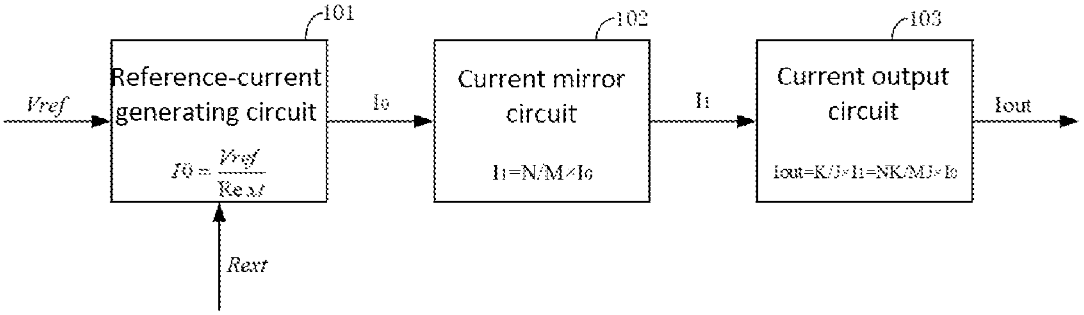
FIG. 1 is a structural schematic diagram of a power supply circuit provided in the background art.
Figure 2:
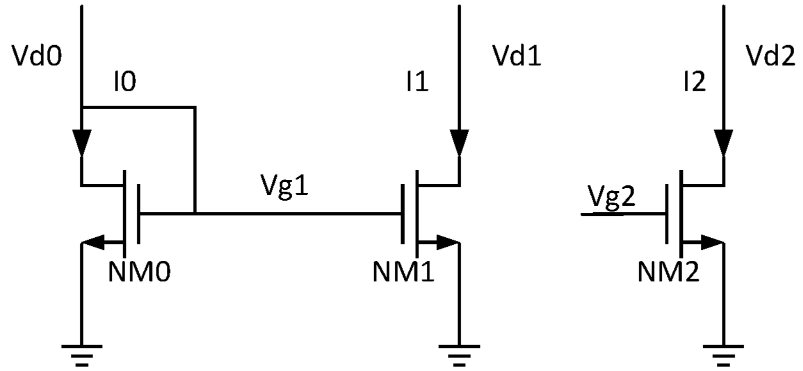
FIG. 2 is a schematic diagram of the principle of the current mirror provided by the embodiment of the present disclosure.

FIG. 2 is a schematic diagram of the principle of the current mirror provided by the embodiment of the present disclosure. As shown in FIG. 2, the N-type field-effect transistor (NOMS) NM0 and the N-type field-effect transistor NM1 have the same gate voltage Vg1. Assuming that the gate voltage of the N-type field-effect transistor NM2 is Vg2, and the drain voltages of N-type field-effect transistor NM0, N-type field-effect transistor NM1, and N-type field-effect transistor NM2 are Vd0, Vd1 and Vd2 respectively, if the gate voltage Vg1 of N-type field-effect transistor NM1 is equal to the gate voltage Vg2 of N-type field-effect transistor NM2, and the drain voltage Vd1 of the N-type field-effect transistor NM1 is equal to the drain voltage Vd2 of the N-type field-effect transistor NM2, then the two devices, the N-type field-effect transistor NM1 and the N-type field-effect transistor NM2, are under the same bias condition, such that the current I1 of the branch where the N-type field-effect transistor NM1 is located is equal to the current I2 of the branch where the N-type field-effect transistor NM2 is located, that is, it can be said that the current I2 mirrors the current I1.

Figure 3:
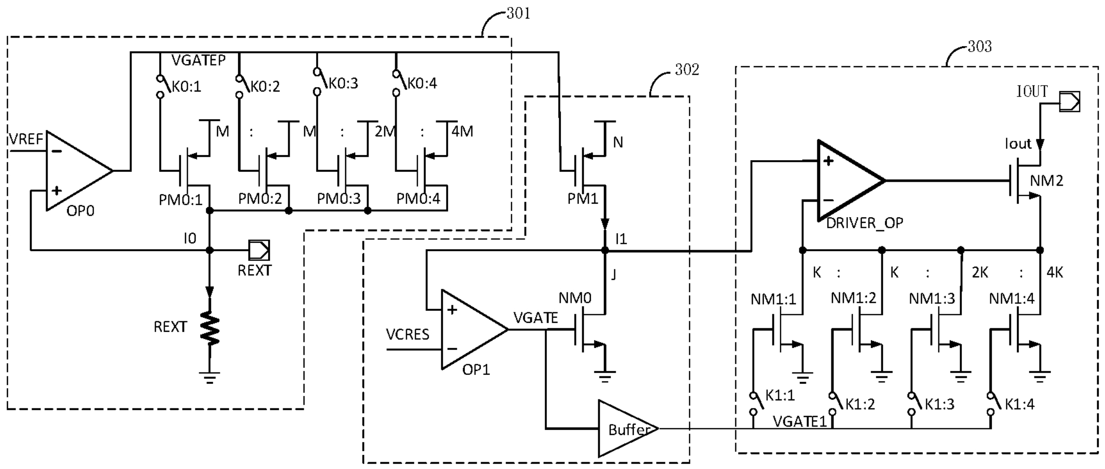
FIG. 3 is a schematic diagram of a power supply circuit provided by an embodiment of the present disclosure.

FIG. 3 is a schematic diagram of a power supply circuit provided by an embodiment of the present disclosure. As shown in FIG. 3, the power supply circuit includes a reference-current generating circuit 301, a driver circuit 302 and a channel-current output circuit 303.

The reference-current generating circuit 301 is configured to generate the reference current I0. Optionally, the reference-current generation circuit 301 includes a first amplifier OP0, a resistor REXT, multi-group first P-type field-effect transistors PM0, and a first switch K0.

The first and the second are mainly used for distinguishing. The inverting input terminal of the first amplifier OP0 is configured to input the reference voltage VREF; the output terminal is connected to the gates of multi-group first P-type field-effect transistors PM0, and configured to provide the gate voltage VGATEP; and the non-inverting input terminal is connected to the second terminal of the resistor REXT. The first terminal of the resistor REXT is grounded, the second terminal is connected to the non-inverting input terminal of the first amplifier OP0 and the drains of multi-group first P-type field-effect transistors PM0. The sources of multi-group first P-type field-effect transistors PM0 are connected to the power supply, the gates are respectively connected to the output terminal of the first amplifier OP0, and the drains are connected to the second terminal of the resistor REXT and output the reference current I0 to the resistor REXT.

The reference voltage VREF may be generated by the bandgap reference voltage source inside the chip, the first amplifier OP0, multi-group first P-type field-effect transistors PM0 and external resistor REXT are used to form the negative feedback structure, so as to obtain the reference current I0.

$$I0 = \frac{Vref}{Rext}$$

In the formula, I0 represents the reference current, Vref represents the reference voltage, and Rext represents the resistance.

The first switch K0 is connected to multi-group first P-type field-effect transistors PM0, and configured to independently control whether each group of first P-type field-effect transistors PM0 are turned on or not.

As shown in FIG. 3, the multi-group first P-type field-effect transistors PM0 may be divided into four groups (PM0:1, PM0:2, PM0:3, PM0:4), for example, the ratio of the number of four groups of the first P-type field-effect transistors PM0 may be M:M:2M:4M; the gates of each group of first P-type field-effect transistors PM0 are connected to the output terminal of the first amplifier OP0, the sources are connected to the power supply, and the drains are connected to the first terminal of the resistor REXT connected to the first amplifier OP0. It can be understood that the above is only one embodiment and should not be regarded as a limitation. In practical application, the number of groups of the first P-type field-effect transistors PM0 can be set flexibly according to requirements.

The first switch K0 may include a plurality of first sub-switches (K0:1, K0:2, K0:3, K0:4), which are connected to multi-group first P-type field-effect transistors PM0 in one-to-one correspondence, and configured to individually control whether the first P-type field-effect transistors PM0 of each group are turned on or not. Each first sub-switch may have two states: connected to a high level to be turned on, and connected to a low level to be turned off.

As shown in FIG. 3, K0:1 is configured to control whether the first group of first P-type field-effect transistors PM0:1 are turned on or not, and K0:2 is configured to control whether the second group of first P-type field-effect transistors PM0:2 are turned on or not, K0:3 is configured to control whether the third group of first P-type field-effect transistors PM0:3 are turned on or not, and K0:4 is configured to control whether the fourth group of first P-type field-effect transistors PM0:4 are turned on or not. According to requirements, the turning on of K0:1, K0:2, K0:3, and K0:4 can be independently controlled, to control the conducted number of the first P-type field-effect transistors PM0.

The driver circuit 302 is connected to the reference-current generating circuit 301 and is configured to generate a mirror current I1 with an adjustable mirror ratio according to the reference current I0 and output a bias voltage and a gate drive voltage.

Optionally, as shown in FIG. 3, the driver circuit 302 includes a second P-type field-effect transistor PM1, a second amplifier OP1 and a first N-type field-effect transistor NM1.

The gate of the second P-type field-effect transistor PM1 is connected to the gates of the multi-group first P-type field-effect transistors PM0, the source is connected to the power supply, and the drain is configured to output the mirror current I1. The second P-type field-effect transistor PM1 and multi-group first P-type field-effect transistors PM0 form a current mirror. Under the same voltage bias, the current of the MOS device is proportional to the size of device; and when adopting the same-size MOS devices, the current ratio is determined by the number of MOS devices. The required current ratio can be obtained by adjusting the number of MOS devices. Therefore, by controlling the first switch K0, the number of the conducted first P-type field-effect transistors PM0 may be adjusted, accordingly controlling the magnitude of the mirror current I1.

As shown in FIG. 3, the ratio of the number of the four groups of first P-type field-effect transistors PM0 may be M:M:2M:4M, which are respectively controlled by switches K0:1, K0:2, K0:3, K0:4. Assuming that by controlling the above switches, the conducted number of first P-type field-effect transistor PM0 is R1×M (R1 may be 1, 2, 3, 4, 5, 6, 7 and 8), then, in the current branch of the second P-type field-effect transistor PM1 and the first N-type field-effect transistor NM0, according to the current mirror, the branch current $I1=N/(R1\times M)\times I0$. I1 represents the output mirror current. N represents the number of the second P-type field-effect transistors PM1. Through the current mirror between the first P-type field-effect transistor PM0 and the second P-type field-effect transistor PM1, a precisely matched mirror current I1 may be obtained.

The inverting input terminal of the second amplifier OP1 is configured to input the reference voltage VCRES, the output terminal is configured to provide the gate drive voltage VGATE, and the non-inverting input terminal is connected to the drain of the first N-type field-effect transistor NM0.

The gate of the first N-type field-effect transistor NM0 is connected to the output terminal of the second amplifier OP1, the source is grounded, and the drain is connected to the drain of the second P-type field-effect transistor PM1 and the non-inverting input terminal of the second amplifier OP1, and configured to provide the same bias voltage as the reference voltage VCRES.

As shown in FIG. 3, the negative feedback loop formed by the second P-type field-effect transistor PM1, the first N-type field-effect transistor NM0 and the second amplifier OP1, the drain voltage (i.e., bias voltage) of the first N-type field-effect transistor NM0 may be set. When the negative feedback system is in a steady state, the voltages of the two input terminals of the second amplifier OP1 are the same (there is only a small difference, depending on the open-loop gain of the loop), so the drain voltage of the first N-type field-effect transistor NM0 is equal to the inverting input voltage VCRES of the second amplifier OP1. That is to say, the bias voltage can be equal to the input reference voltage.

The channel-current output circuit 303 is connected to the driver circuit 302 and is configured to receive the bias voltage and the gate drive voltage and generate a channel current Iout with an adjustable mirror ratio according to the mirror current I0.

As shown in FIG. 3, the channel-current output circuit includes a third amplifier DRIVER_OP, a third N-type field-effect transistor NM2, multi-group second N-type field-effect transistors NM1 and a second switch K1.

The non-inverting input terminal of the third amplifier DRIVER_OP is connected to the drain of the first N-type field-effect transistor NM0, so the voltage input to the non-inverting input terminal of the third amplifier DRIVER_OP is equal to the reference voltage VCRES. The gate of the third N-type field-effect transistor NM2 is connected to the output terminal of the third amplifier DRIVER_OP; the source is connected to the drains of multi-group second N-type field-effect transistors NM1 and the inverting input terminal of the third amplifier DRIVER_OP; and the drain is configured to output the channel current.

When the negative feedback system is in a steady state, the voltages of the two input terminals of the amplifier are the same, so the voltage input to the inverting input terminal of the third amplifier DRIVER_OP is also equal to the reference voltage VCRES. In this way, a bias voltage is provided for multi-group second N-type field-effect transistors NM1, and the bias voltage is also equal to the reference voltage VCRES.

The drains of multi-group second N-type field-effect transistors NM1 are respectively connected to the inverting input terminal of the third amplifier DRIVER_OP; the gates are respectively connected to the output terminal of the second amplifier OP1; and the sources are grounded.

The second switch K1 is connected to multi-group the second N-type field-effect transistors NM1, and configured to independently control whether each group of the second N-type field-effect transistors NM1 is turned on or not.

Optionally, as shown in FIG. 3, the second N-type field-effect transistors NM1 may be divided into four groups (NM1:1, NM1:2, NM1:3, NM1:4), and the ratio of the number of mos transistors in each group is K:K:2K:4K. Each group of second N-type field-effect transistors NM1 are connected to the inverting input terminal of the third amplifier DRIVER_OP and the source of the third N-type field-effect transistor NM2, accordingly providing the same bias voltage for each group of N-type field-effect transistors NM1. It can be understood that what is described above is only an embodiment and should not be regarded as a limitation. In practical applications, the number of groups of the second N-type field-effect transistors NM1 may be set flexibly according to requirements.

The second switch K1 may include a plurality of second sub-switches (K1:1, K1:2, K1:3, K1:4), which are connected to the multi-group second N-type field-effect transistors NM1 in one-to-one correspondence, and configured to individually control whether the second N-type field-effect transistors NM1 of each group are turned on or not. Each second sub-switch can have two states: connected to a high level to be turned on, and connected to a low level to be turned off.

As shown in FIG. 3, K1:1 controls whether the first group of second N-type field-effect transistors NM1:1 are turned on or not, K1:2 controls whether the second group of second N-type field-effect transistors NM1:2 are turned on or not, K1:3 controls whether the third group of second N-type field-effect transistors NM1:3 are turned on or not, and K1:4 controls whether the fourth group of second N-type field-effect transistors NM1:4 are turned on or not.

The ratio of the number of multi-group second N-type field-effect transistors NM1 can be K:K:2K:4K. Assuming that by controlling the above-mentioned second switch K1, the conducted number of the second N-type field-effect transistors NM1 is R2×K (R2 may be 1, 2, 3, 4, 5, 6, 7, 8). The number of the first N-type field-effect transistors NM0 is assumed to be J, since the gate voltage of the second N-type field-effect transistor NM1 is equal to VGATE and the drain voltage is equal to VCRES, in the current branch of the second N-type field-effect transistor NM1 and the third N-type field-effect transistor NM2, according to the current mirror, an accurate output current can be obtained, and the branch current Iout=R2×K/J×I1, wherein Iout represents the channel current. Therefore, by controlling the second switch K1, the conducted number R2×K of the second N-type field-effect transistor NM1 may be adjusted, thereby controlling the magnitude of the output current Iout.

Optionally, as shown in FIG. 3, the driver circuit 302 further includes a driver buffer, which is connected to the output terminal of the second amplifier OP1 and the gates of the multi-group second N-type field-effect transistors NM1, and configured to increase the gate drive voltage and increase the drive capability of the subsequent stage. The Buffer may be several stages of inverters with gradually increased device sizes or a circuit of similar structure, for example, two inverters connected in series.

Optionally, the ratio of the number of multiple groups of first P-type field-effect transistors may be the same as the ratio of number of multiple groups of second N-type field-effect transistors. For example, the ratio of number of multi-group first P-type field-effect transistors PM0 is M:M:2M:4M; and the ratio of number of multi-group second N-type field-effect transistors NM1 is K:K:2K:4K. In this case, it can be considered that the ratios of number are the same.

Optionally, the adjustment ratio of conducted number of multi-group first P-type field-effect transistors is the same as the adjustment ratio of the conducted number of multi-group second N-type field-effect transistors.

That is to say, R1 and R2 mentioned above are equal. The conducted number of the first P-type field-effect transistor PM0 may be controlled by the first switch K0. The conducted number of the first P-type field-effect transistor PM0 may be M, 2M, 3M, 4M, 5M, 6M, 7M, and 8M. The conducted number of the second N-type field-effect transistor NM1 may be controlled by the second switch K1. The conducted number of the second N-type field-effect transistor NM1 may be K, 2K, 3K, 4K, 5K, 6K, 7K and 8K. Therefore, when the conducted number of the first P-type field-effect transistor PM0 is M, the conducted number of the second N-type field-effect transistor NM1 is K; and when the conducted number of the first P-type field-effect transistor PM0 is 2M, the conducted number of the second N-type field-effect transistor NM1 is 2K. By analogy, it can be considered that the adjustment ratios of the conducted number are the same.

Optionally, the switch control signals for the first switch and the second switch may be the same, such that the adjustment ratio of conducted number of multi-group first P-type field-effect transistors is equal to that of multi-group second N-type field-effect transistors, namely, controlling the values of R1 and R2 to be equal. The switch control signal may be configured to control the first switch K0 and the second switch K1, when the switch control signals are the same, that is, the control signals of K0:1 and K1:1 are the same, the control signals of K0:2 and K1:2 are the same, the control signals of K0:3 and K1:3 are the same, and the control signals of K0:4 and K1:4 are the same, when the ratio of the number of multiple groups of first P-type field-effect transistors PM0 is the same as that of multiple groups of second N-type field-effect transistors NM1, the adjustment ratios of the conducted number may be the same, namely, R1=R2. After twice mirroring of the current, it can be obtained:

$$I0 = \frac{Vref}{Rext}$$

$$I1 = \frac{N}{R \cdot M} \cdot I0$$

$$Iout = \frac{R \cdot K}{J} \cdot I1$$

$$Iout = \frac{N \cdot K}{M \cdot J} \cdot \frac{Vref}{Rext}$$

wherein both R1 and R2 can be represented by R, and are offset. The precise output current Iout can be obtained by adjusting the ratio of the twice mirroring of the resistor REXT.

Optionally, when the output current is small, it is possible to only turn on K0:1 and K1:1. At this time, the accuracy of the constant-current source is the best. When the output current Iout increases and exceeds the capability of NM1:1, K0:2 and K1:2 are turned on. In this way, with the increase of the set output current Iout, the switches K0:1 to K0:4 and K1:1 to K1:4 are turned on one by one, that is, fewer groups of NMOS devices are turned on when the current is smaller, which will improve the current accuracy of the chip. In order to keep the NMOS device in the linear region, the VGATE voltage may be monitored to judge, and once the VGATE is too high or too low, the next-stage switch is turned on or the current switch is turned off. Optionally, by setting a comparator and a logic circuit, whether the VGATE voltage is too high or too low can be automatically judged, thereby a corresponding switch control signal is output to control the first switch K0 and the second switch K1, so as to ensure the accuracy of the current mirror in a larger current range, while reducing the power consumption of the chip. The table below shows the R values for different turning-on states of the switch.

| Turning-on states of grouping switch K0 | K0: 1 turned on | K0: 1, K0: 2 turned on | K0: 1, K0: 2, K0: 3 turned on | K0: 1, K0: 2, K0: 3, K0: 4 turned on |
|---|---|---|---|---|
| R | 1 | 2 | 4 | 8 |

At this point, the static current of the chip is calculated by the following formula:

$$Idis=Idis\_ana+I0+I1+L*ICH,$$

where Idis represents the static current of the entire chip; Idis_ana represents the static current of other analog modules; I0 and I1 represent respectively the currents of two branches in the power supply circuit; L represents the number of output constant-current channels; and ICH represents the static current of the analog circuit in the constant-current-source channel. In general, N/M>1 and K/J>1. Therefore, it is I1 that changes greatly in the static current of the chip.

According to the circuit provided in the embodiment of the present disclosure, $$I1 = \frac{N}{R \cdot M} \cdot I0$$

when current Iout of the output constant-current source increases, R increases accordingly, and I1 decreases, so it can be concluded that the circuit architecture provided in the embodiment of the present disclosure can effectively reduce chip power consumption.

The power supply circuit provided in the embodiment of the present disclosure may be applied in a driving chip, and the driving chip may be a driving chip of an LED (Light Emitting Diode) display panel. The embodiment of the present disclosure also provides a display apparatus, which may include an LED display panel and a driving chip, and the LED display panel may have a common cathode or common anode structure. The driving chip is connected to the LED display panel, and the driving chip may include the power supply circuit provided by the embodiment of the present disclosure, wherein there are multiple channel-current output circuits. The common anode means that the anodes of multiple light emitting diodes in the same row are connected together (for example, connected to +5V), the output terminals IOUT of multiple channel-current output circuits are respectively connected to the cathodes of multiple light emitting diodes, and the difference levels of cathode lead to different brightness. The common cathode means that the cathodes of multiple light emitting diodes in the same row are connected together (for example, grounded), and the output terminals IOUT of multiple channel-current output circuits are respectively connected to the anodes of multiple light emitting diodes. Different levels of anode lead to different brightness.

Each functional module in each embodiment of the present disclosure may be integrated together to form an independent portion, or each module may exist independently, or two or more modules may be integrated to form an independent portion. The “connection” mentioned herein may be directly connection or indirectly connection.

INDUSTRIAL APPLICABILITY

The technical solution proposed in the present disclosure can improve the current accuracy because the mirror ratio can be adjusted, and when the channel current is required to be larger, the mirror current can still be small, thereby reducing power consumption.

The invention claimed is:

1. A power supply circuit, wherein the power supply circuit comprises:

a reference-current generating circuit, configured to generate a reference current;

a driver circuit, connected to the reference-current generating circuit, configured to generate a mirror current with an adjustable mirror ratio according to the reference current and output a bias voltage and a gate drive voltage; and a channel-current output circuit, connected to the driver circuit and configured to receive the bias voltage and the gate drive voltage, and generate a channel current with an adjustable mirror ratio according to the mirror current, wherein the reference-current generating circuit comprises:

a first amplifier, comprising a inverting input terminal configured to input a reference voltage;

a resistor, comprising a first terminal grounded and a second terminal connected to a non-inverting input terminal of the first amplifier;

multi-group first P-type field-effect transistors, comprising sources connected to a power supply, gates respectively connected to a output terminal of the first amplifier, and drains connected to the second terminal of the resistor, and outputting the reference current to the resistor; and a first switch, connected to the multi-group first P-type field-effect transistors and configured to independently control whether each group of first P-type field-effect transistors are turned on or not, wherein the driver circuit comprises:

a second P-type field-effect transistor, comprising a source connected to the power supply, a gate connected to the gates of the multi-group first P-type field-effect transistors, and a drain configured to output the mirror current;

a second amplifier, comprising an inverting input terminal configured to input a reference voltage, and an output terminal configured to provide the gate drive voltage; and a first N-type field-effect transistor, comprising a gate connected to the output terminal of the second amplifier, a source grounded, and a drain connected to the drain of the second P-type field-effect transistor and a non-inverting input terminal of the second amplifier, and configured to provide the bias voltage same as the reference voltage.

2. The power supply circuit according to claim 1, wherein the number of groups of the first P-type field-effect transistors is four.

3. The power supply circuit according to claim 2, wherein the driver circuit comprises:

a second P-type field-effect transistor, comprising a source connected to the power supply, a gate connected to the gates of the multi-group first P-type field-effect transistors, and a drain configured to output the mirror current;

a second amplifier, comprising an inverting input terminal configured to input a reference voltage, and an output terminal configured to provide the gate drive voltage; and a first N-type field-effect transistor, comprising a gate connected to the output terminal of the second amplifier, a source grounded, and a drain connected to the drain of the second P-type field-effect transistor and a non-inverting input terminal of the second amplifier, and configured to provide the bias voltage same as the reference voltage.

4. The power supply circuit according to claim 1, wherein the channel-current output circuit comprises:

a third amplifier, comprising a non-inverting input terminal connected to the drain of the first N-type field-effect transistor;

a third N-type field-effect transistor, comprising a gate connected to an output terminal of the third amplifier, a source connected to an inverting input terminal of the third amplifier, and a drain configured to output the channel current;

multi-group second N-type field-effect transistors, comprising drains respectively connected to the inverting input terminal of the third amplifier, gates respectively connected to the output terminal of the second amplifier, and sources grounded; and a second switch, connected to the multi-group second N-type field-effect transistors, and configured to independently control whether each group of second N-type field-effect transistors are turned on or not.

5. The power supply circuit according to claim 4, wherein the number of groups of the second N-type field-effect transistors is four.

6. The power supply circuit according to claim 4, wherein the driver circuit further comprises:

a driver buffer, connected to the output terminal of the second amplifier and the gates of the multi-group second N-type field-effect transistors, and configured to increase the gate drive voltage.

7. The power supply circuit according to claim 6, wherein the driver buffer comprises two inverters connected in series.

8. The power supply circuit according to claim 4, wherein the first switch comprises a plurality of first sub-switches, which each independently control whether the multi-group first P-type field-effect transistors are turned on or not; and the second switch comprises a plurality of second sub-switches, which each independently control whether the multi-group second N-type field-effect transistors are turned on or not.

9. The power supply circuit according to claim 8, wherein the plurality of first sub-switches is connected to the multi-group first P-type field-effect transistors in one-to-one correspondence; and the plurality of second sub-switches are connected to the multi-group second N-type field-effect transistors in one-to-one correspondence.

10. The power supply circuit according to claim 4, wherein a ratio of number of multiple groups of the first P-type field-effect transistors is the same as a ratio of number of multiple groups of the second N-type field-effect transistors.

11. The power supply circuit according to claim 10, an adjustment ratio of conducted number of the multi-group first P-type field-effect transistors is the same as an adjustment ratio of conducted number of the multi-group second N-type field-effect transistors.

12. The power supply circuit according to claim 11, wherein switch control signals of the first switch and the second switch are the same.

13. A driving chip, wherein the driving chip comprises the power supply circuit according to claim 1.

14. A display apparatus, wherein the display apparatus comprises:

a LED display panel, which is of a common cathode or common anode structure; and a driving chip, connected to the LED display panel and comprising the power supply circuit according to claim 1, wherein a plurality of channel-current output circuits are provided, wherein if the LED display panel is of a common cathode structure, the plurality of channel-current output circuits are respectively connected to anodes of a plurality of light emitting diodes of the LED display panel; and if the LED display panel is of a common anode structure, the plurality of channel-current output circuits are respectively connected to cathodes of the plurality of light emitting diodes of the LED display panel.

* * * * *